US007375888B2

(12) United States Patent
Moia

(10) Patent No.: US 7,375,888 B2
(45) Date of Patent: May 20, 2008

(54) OPTICAL COMPONENT

(75) Inventor: Franco Moia, Frenkendorf (CH)

(73) Assignee: Rolic Ltd, Allschwil (CH)

( * ) Notice: Subject to any disclaimer, the term of this patent is extended or adjusted under 35 U.S.C. 154(b) by 0 days.

(21) Appl. No.: 11/499,654

(22) Filed: Aug. 7, 2006

(65) Prior Publication Data
US 2007/0035833 A1 Feb. 15, 2007

Related U.S. Application Data

(63) Continuation of application No. 10/721,104, filed on Nov. 26, 2003, now abandoned, which is a continuation of application No. 09/831,524, filed as application No. PCT/IB99/01810 on Nov. 10, 1999, now abandoned.

(30) Foreign Application Priority Data
Nov. 13, 1998 (GB) ................. 9825023.6

(51) Int. Cl.
G02B 5/30 (2006.01)
G02B 27/28 (2006.01)
B42D 15/00 (2006.01)
(52) U.S. Cl. ............ 359/494; 359/500; 359/489; 283/90; 283/902
(58) Field of Classification Search ........ 359/483, 359/485, 489, 494, 497, 500; 349/98, 117; 283/90, 902
See application file for complete search history.

(56) References Cited

U.S. PATENT DOCUMENTS

| 2,165,974 A | 7/1939 | Land |
| 2,440,105 A | 4/1948 | Land et al. |
| 3,348,217 A | 10/1967 | Snaper |
| 4,220,705 A | 9/1980 | Sugibuchi et al. |
| 5,101,296 A | 3/1992 | Bell |
| 5,284,364 A | 2/1994 | Jain |
| 5,548,427 A | 8/1996 | May |
| 5,576,862 A | 11/1996 | Sugiyama et al. |
| 5,602,661 A | 2/1997 | Schadt et al. |
| 5,784,139 A | 7/1998 | Chigrinov et al. |
| 5,838,407 A | 11/1998 | Chigrinov et al. |
| 5,903,330 A | 5/1999 | Funfschilling et al. |
| 6,124,970 A | 9/2000 | Karassev et al. |
| 6,144,428 A | 11/2000 | Schadt et al. |
| 6,160,597 A | 12/2000 | Schadt et al. |
| 6,215,539 B1 | 4/2001 | Schadt et al. |
| 6,496,239 B2 | 12/2002 | Seiberie |
| 6,496,287 B1 * | 12/2002 | Seiberle et al. ........... 359/15 |

(Continued)

FOREIGN PATENT DOCUMENTS

EP   A-0 611 786 B1   2/1994

(Continued)

Primary Examiner—Ricky D. Shafer
(74) Attorney, Agent, or Firm—Sughrue Mion, PLLC

(57) ABSTRACT

An optical component contains two or more hidden images for authentication and antiforgery purposes. The images are successively revealed and concealed when the optical component is held between two polarisers and one of them is rotated. The optical component comprises one or more optical retarder(s) in which the images are embedded in separate adjacent stripes or areas, each image being associated with a different mode of interaction with polarised light. Instead of two polarisers, one will suffice if the component is mounted on a reflector.

14 Claims, 17 Drawing Sheets

U.S. PATENT DOCUMENTS 6,734,936 B1 * 5/2004 Schadt et al. ............... 349/117
6,806,930 B2 * 10/2004 Moia ........................ 349/117

FOREIGN PATENT DOCUMENTS

| EP | A-0 689 084 B1 | 6/1995 |
|----|----------------|--------|
| EP | 0 689 065 A1 | 12/1995 |
| EP | A-0 763 552 B1 | 9/1996 |
| EP | 0 722 069 A1 | 5/1997 |
| GB | 2 268 906 A | 1/1994 |
| WO | WO 96/10049 | 4/1996 |
| WO | WO 98/52077 | 11/1998 |
| WO | WO 99/53349 | 10/1999 |
| WO | WO 00/57356 | 9/2000 |

* cited by examiner

Figure 1:   Magnified version of an optical component (picture I)
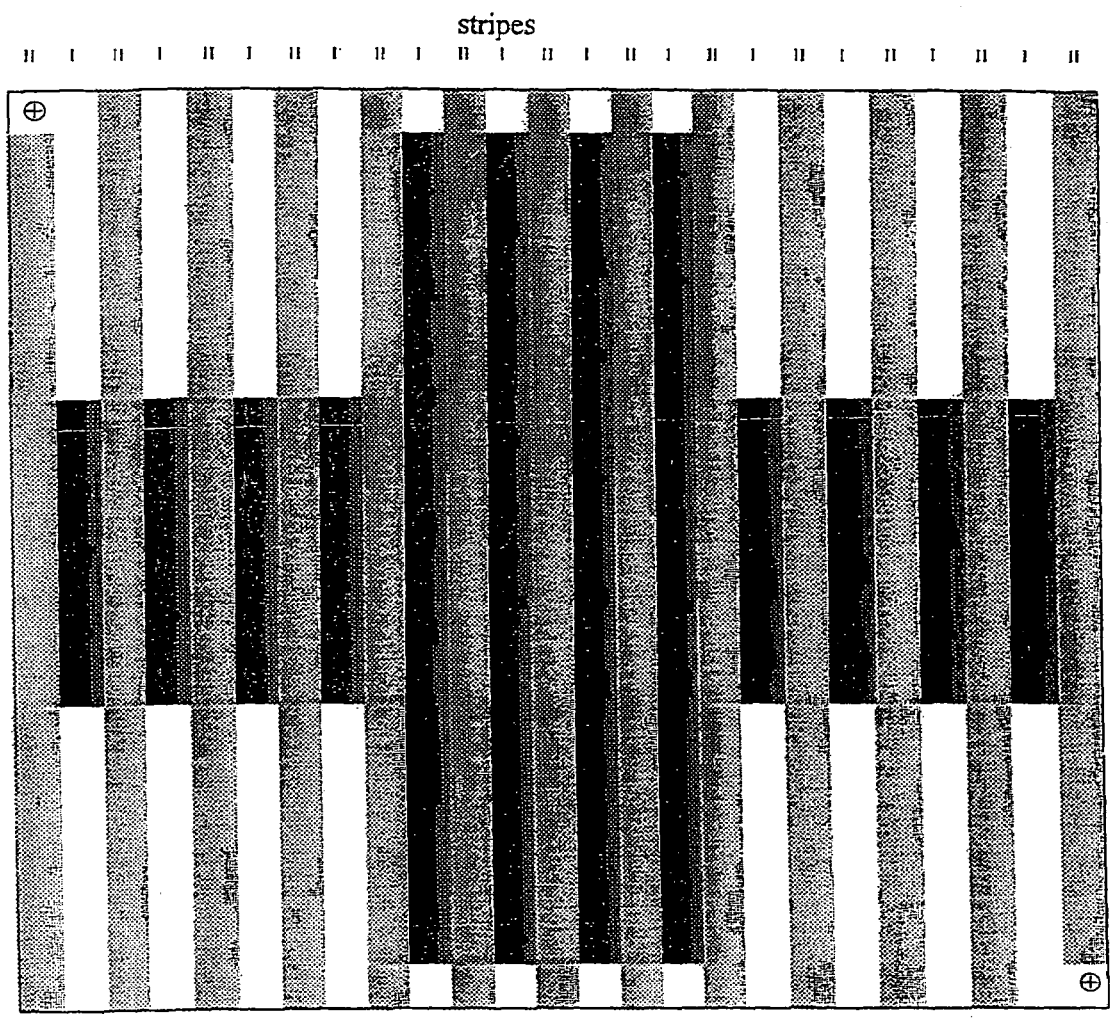
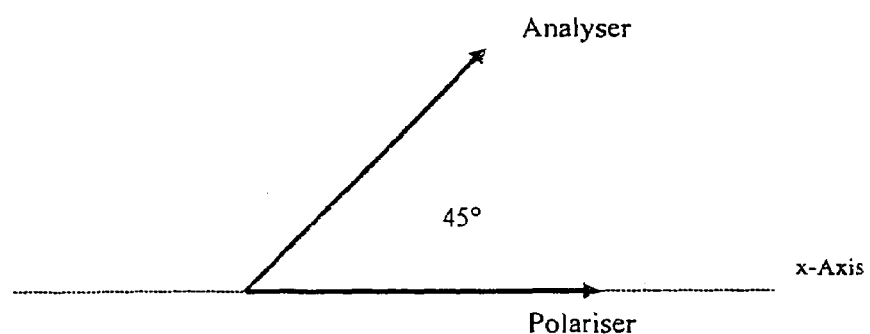
Appearance of pixels:   stripes I :    white or black
                        stripes II:    grey Figure 2: Magnified version of an optical component (picture II)
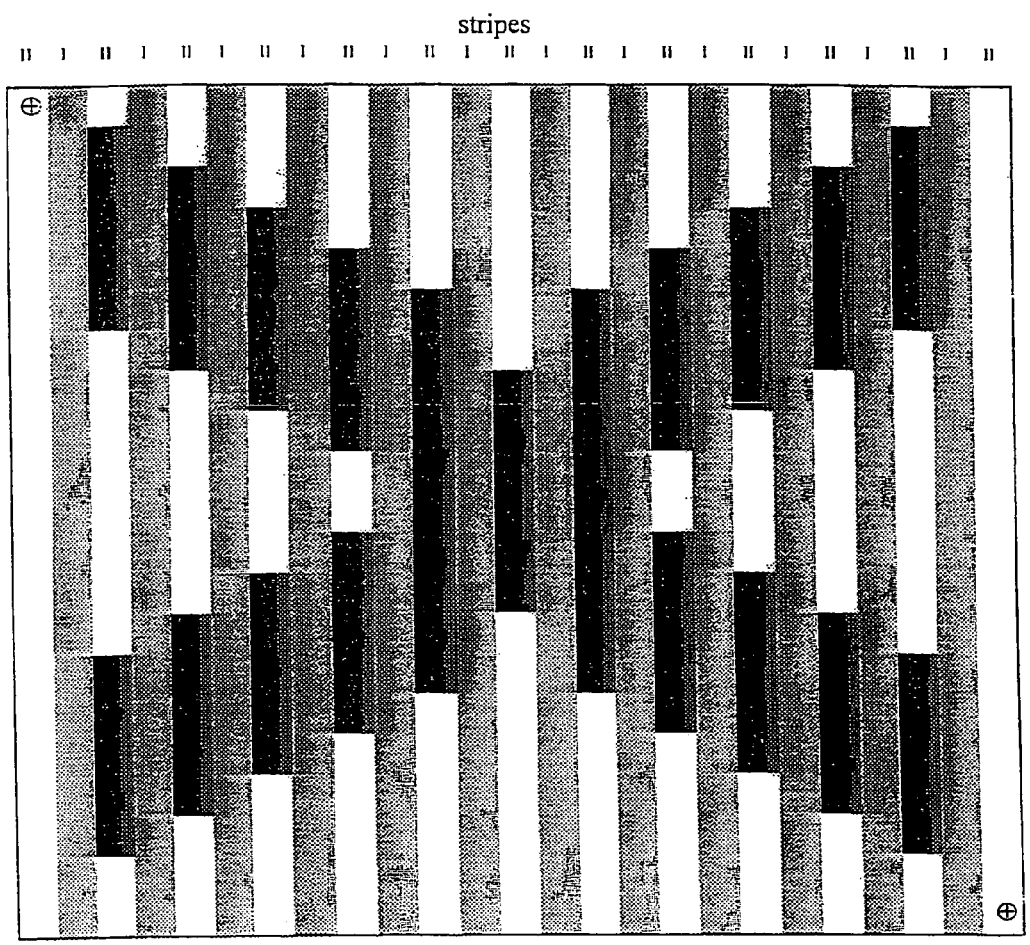
Appearance of the pixels:  stripes I :  grey to brownish
stripes II: whitish and black
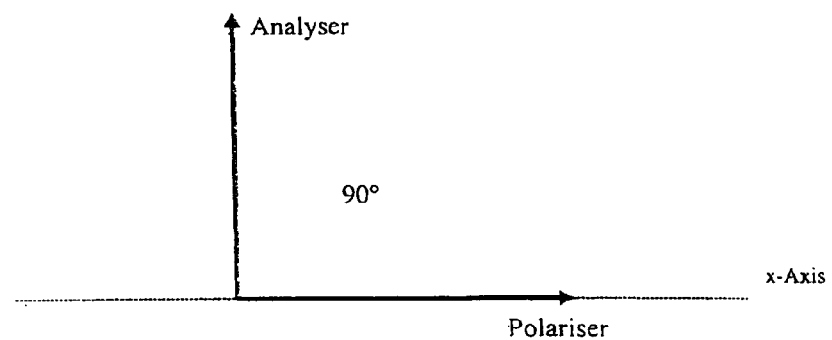

Figure 3: Magnified version of an optical component (picture II): 'negative counterpart' to Figure 1
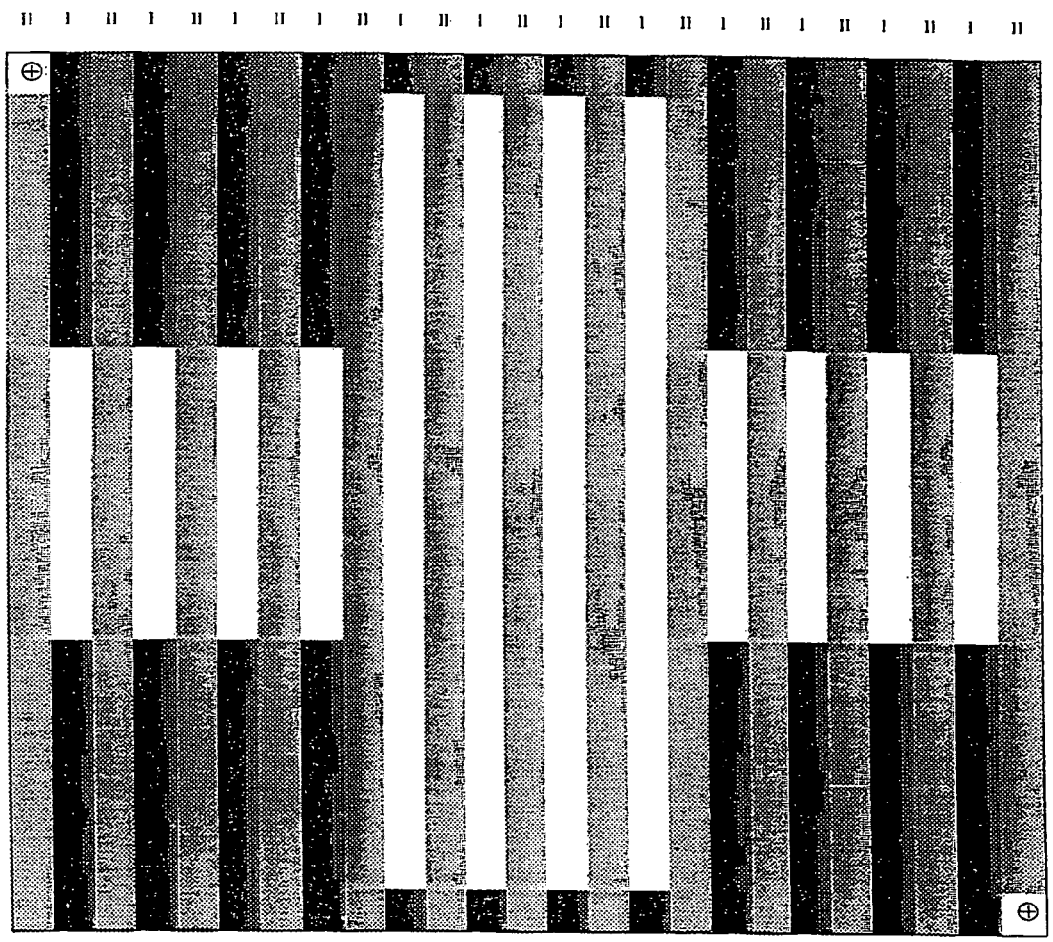
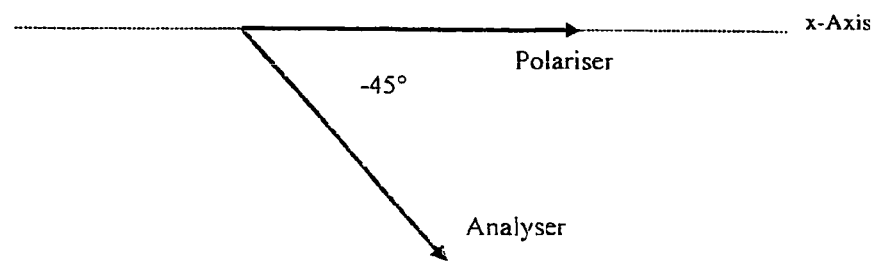

Figure 4: Magnified version of an optical component (picture II): 'negative counterpart' to Figure 2
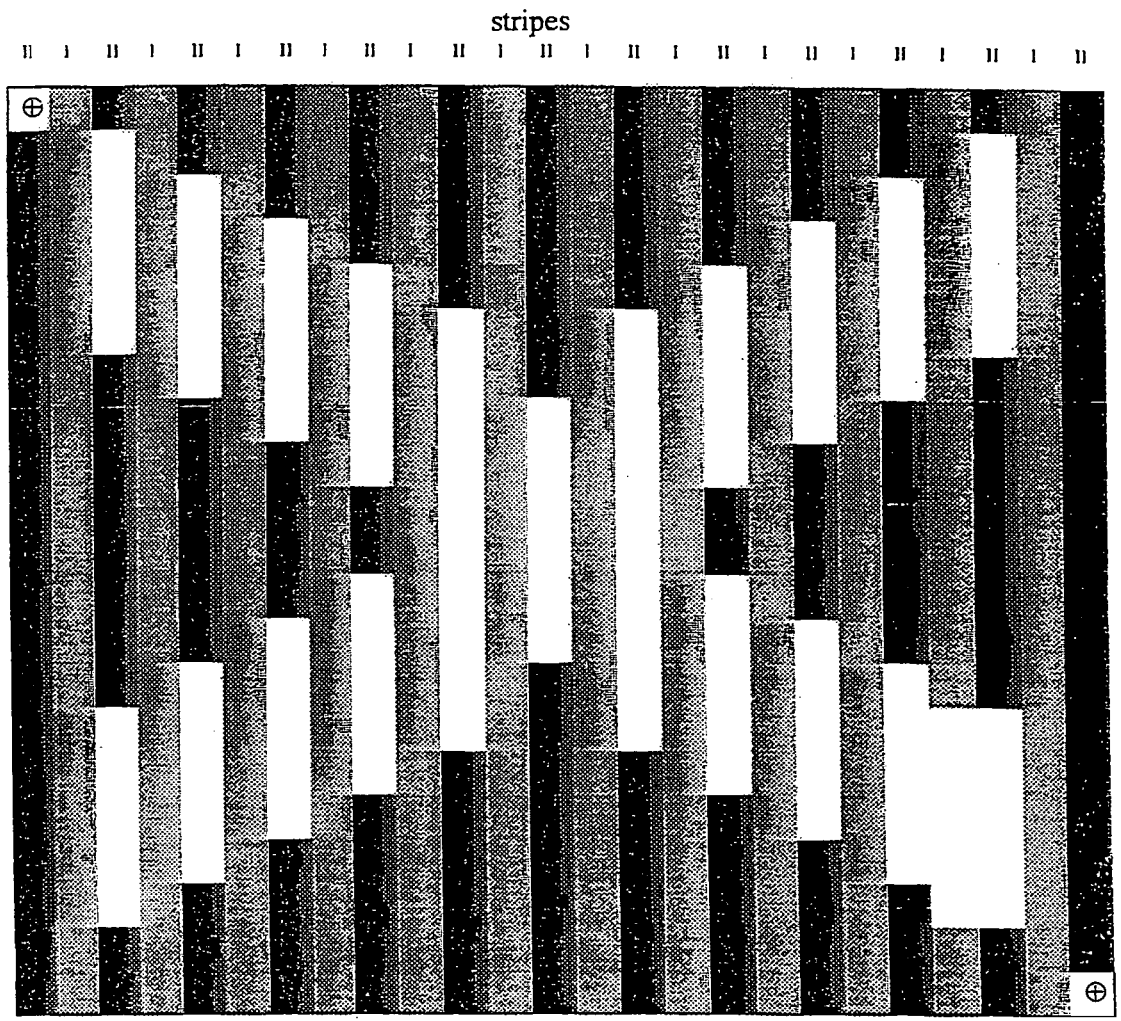
Appearance of the pixels: stripes I : grey
stripes II: white and 'brown'
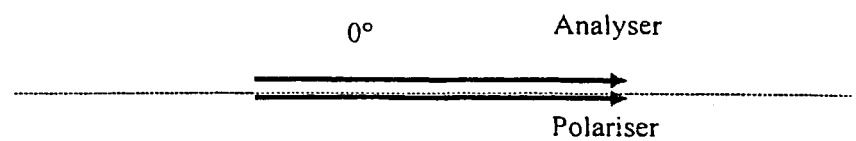

Figure 5: Stripe photo mask (picture I); magnified
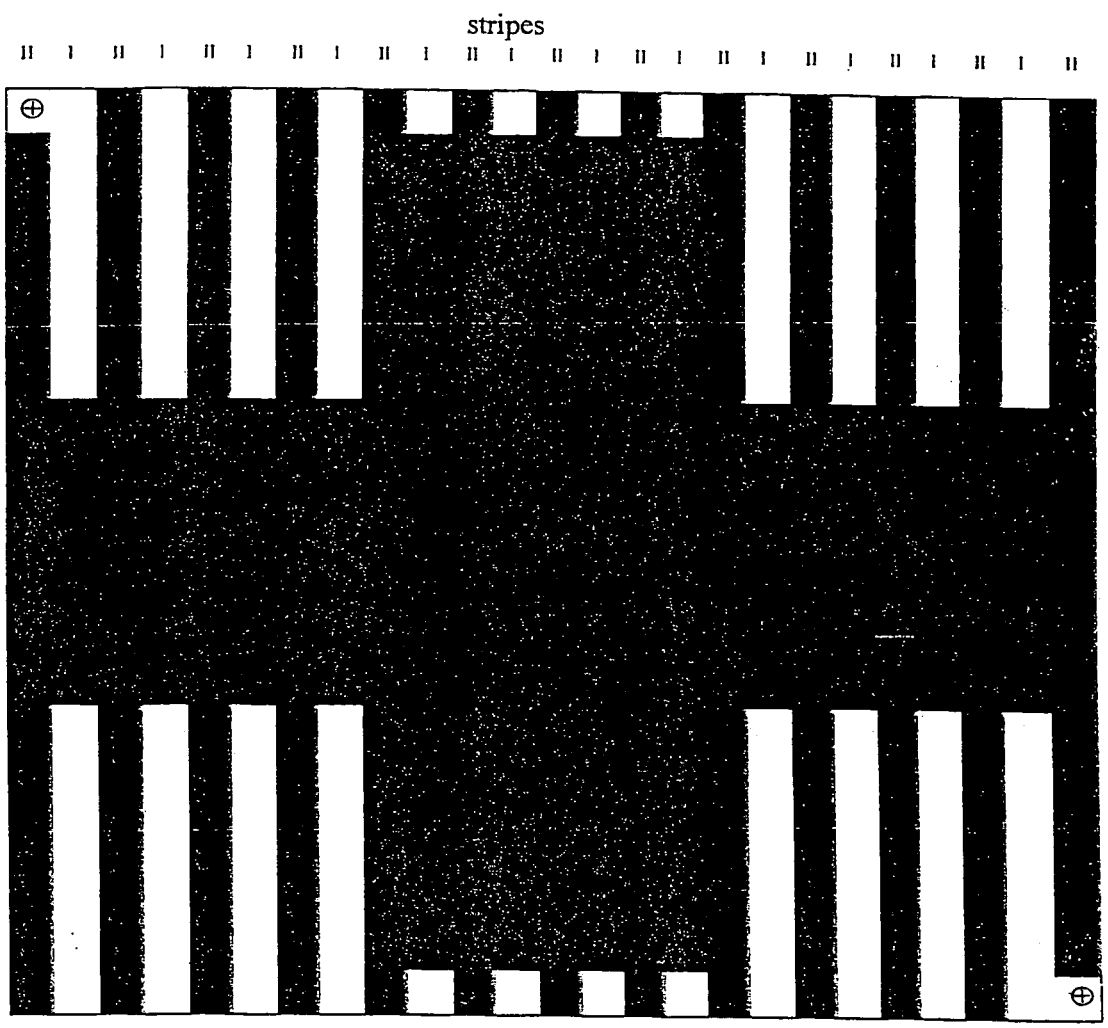

Figure 6: Stripe photo mask (picture II): not absolutely necessary to generate the optical component (magnified)
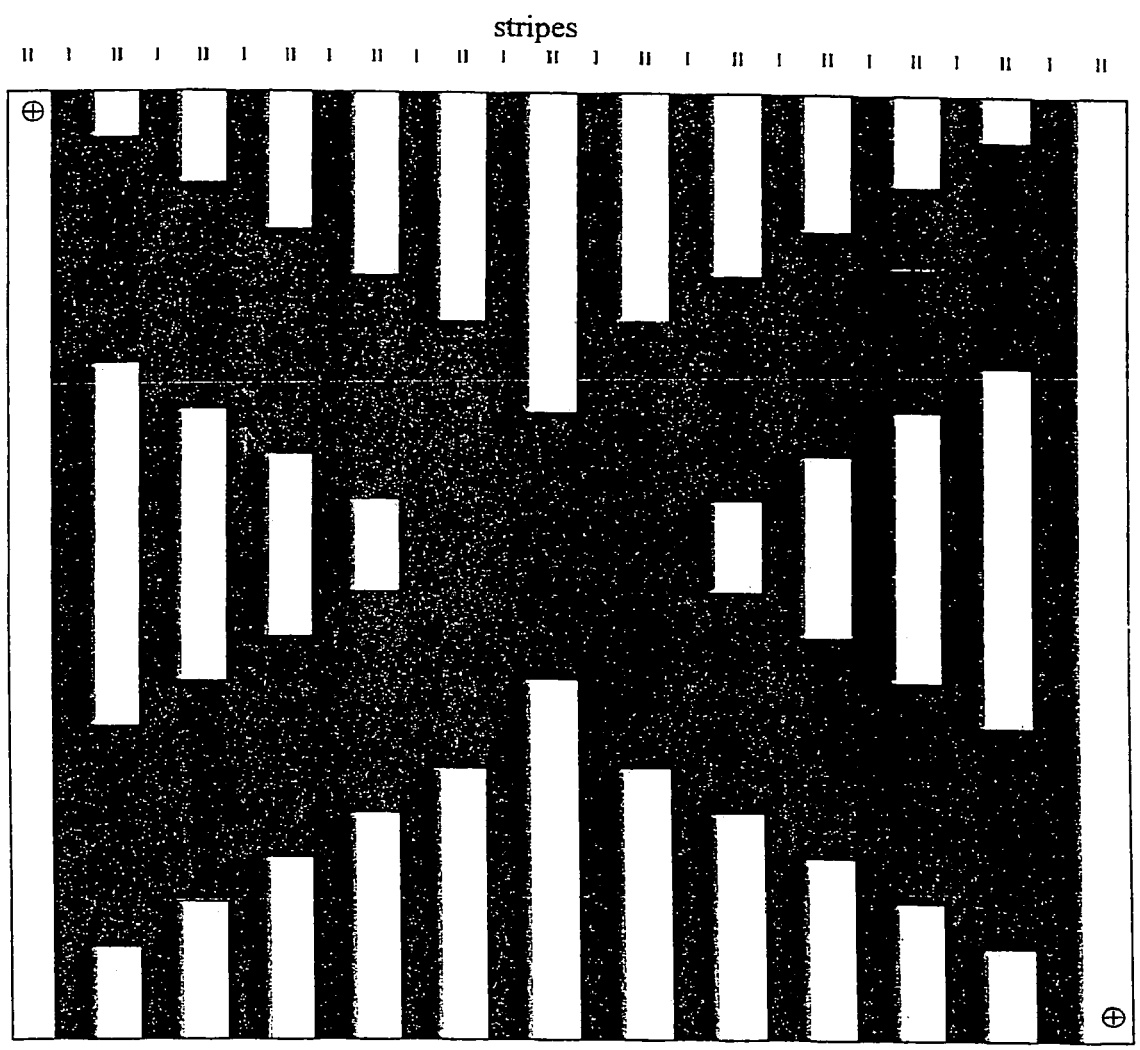

Figure 7: Stripe photo mask I; magnified
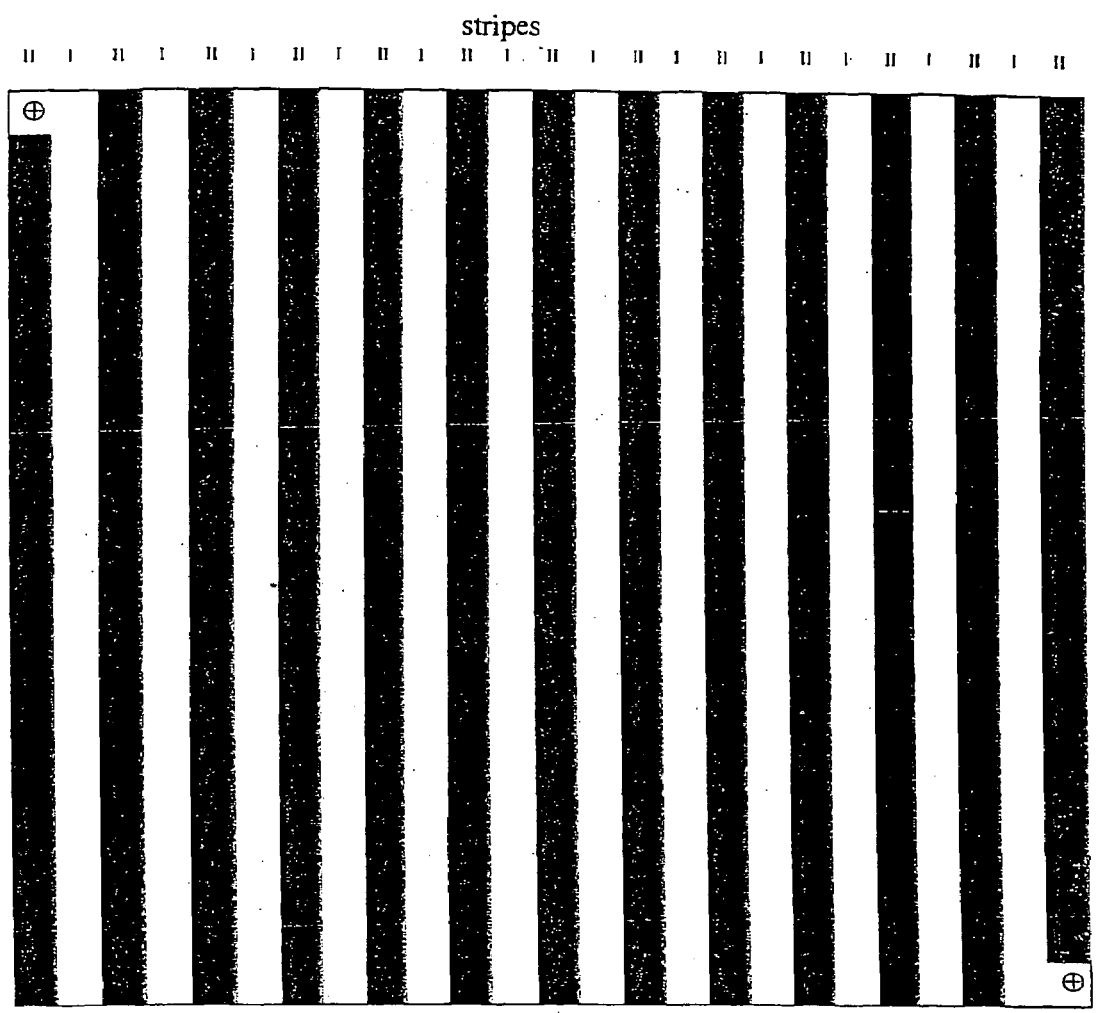

Figure 8: Photo mask (picture II); without stripes (magnified)
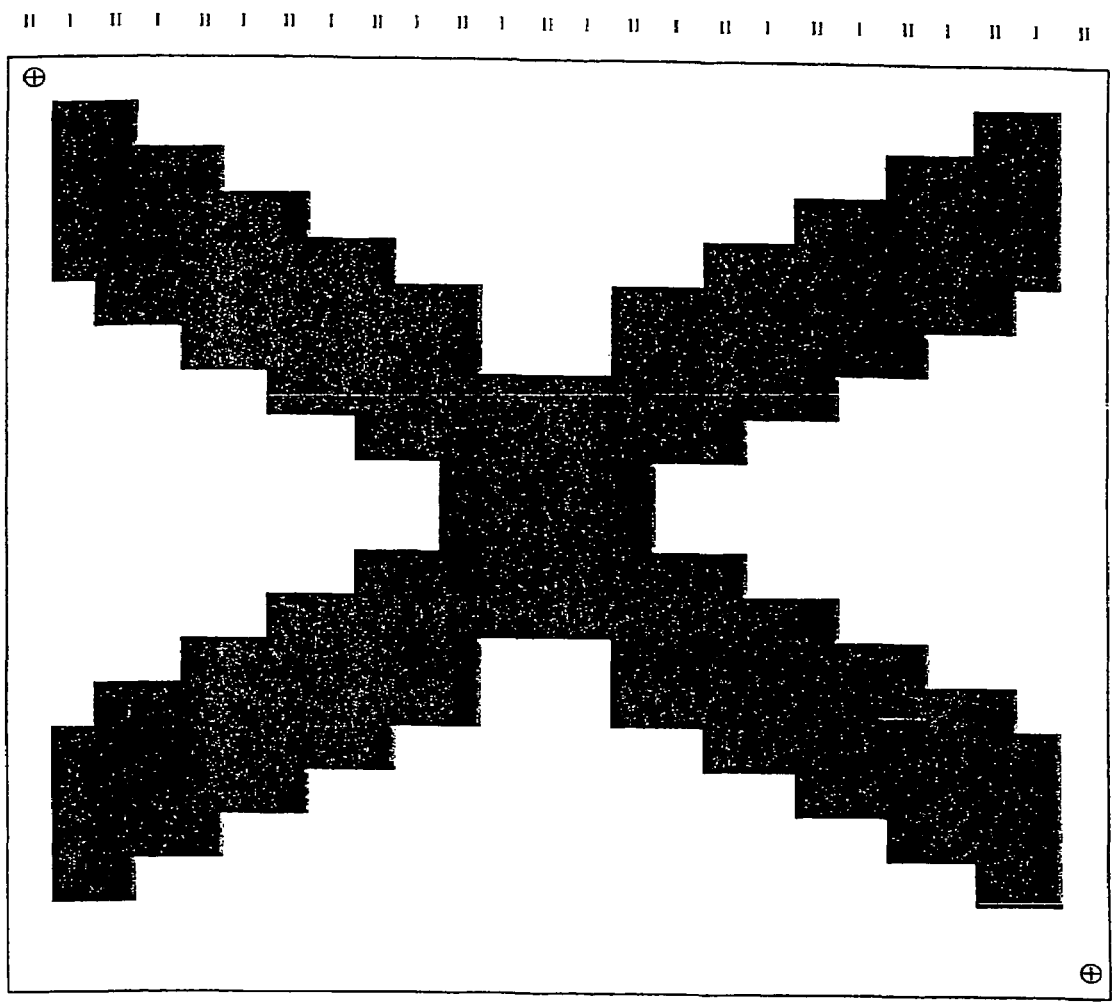

Figure 9: Picture in Picture manufactured with 2 retarder layers: Contrasts
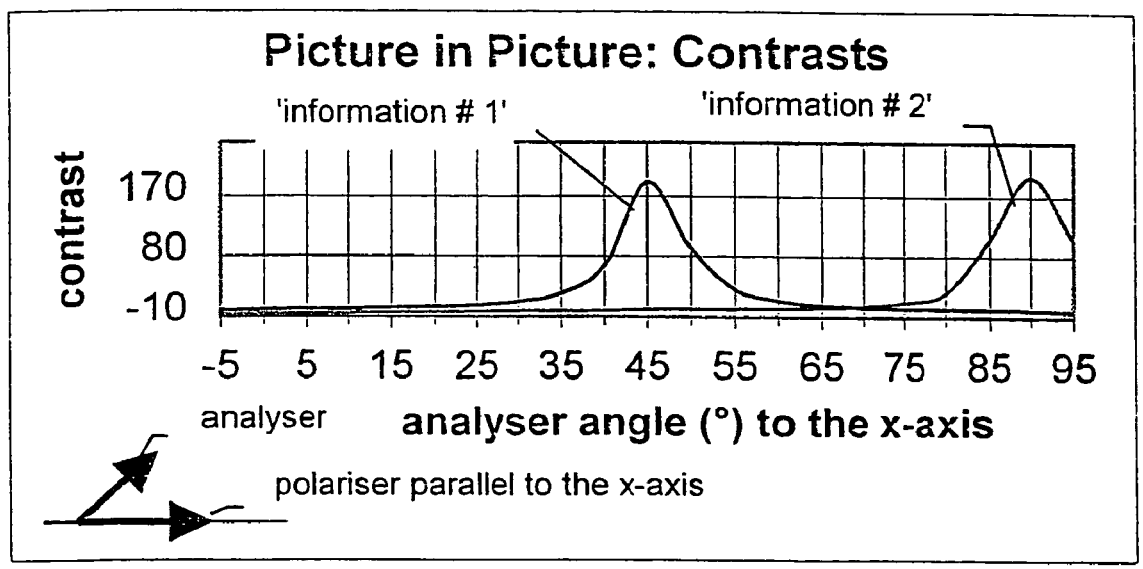

Figure 10: Picture in Picture manufactured with 1 retarder layer: Contrasts
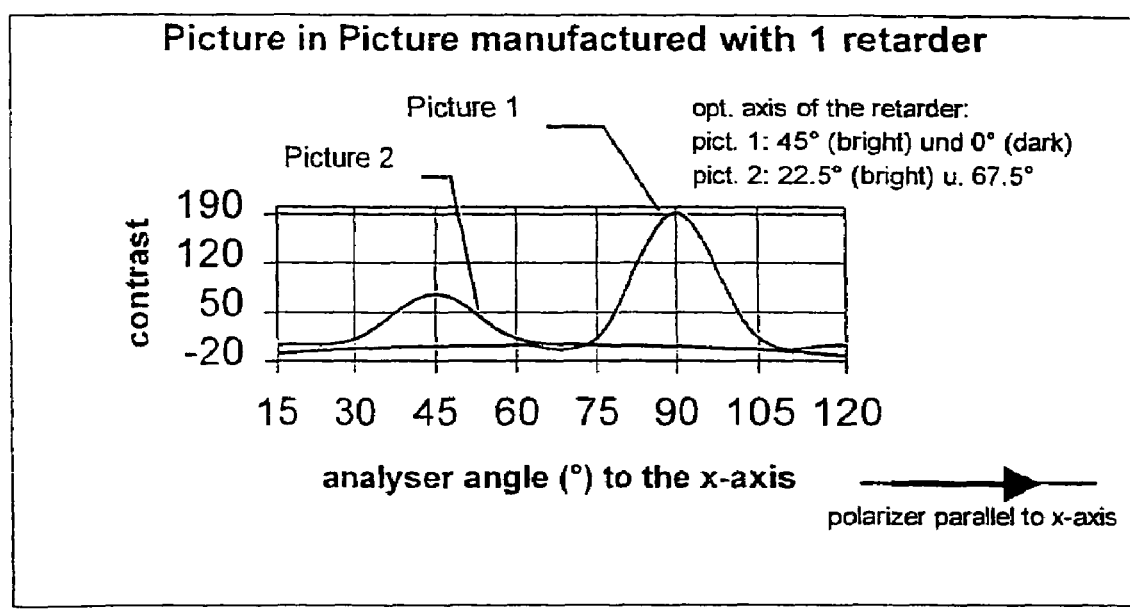

Figure 11: Magnified version of an optical component (picture I)
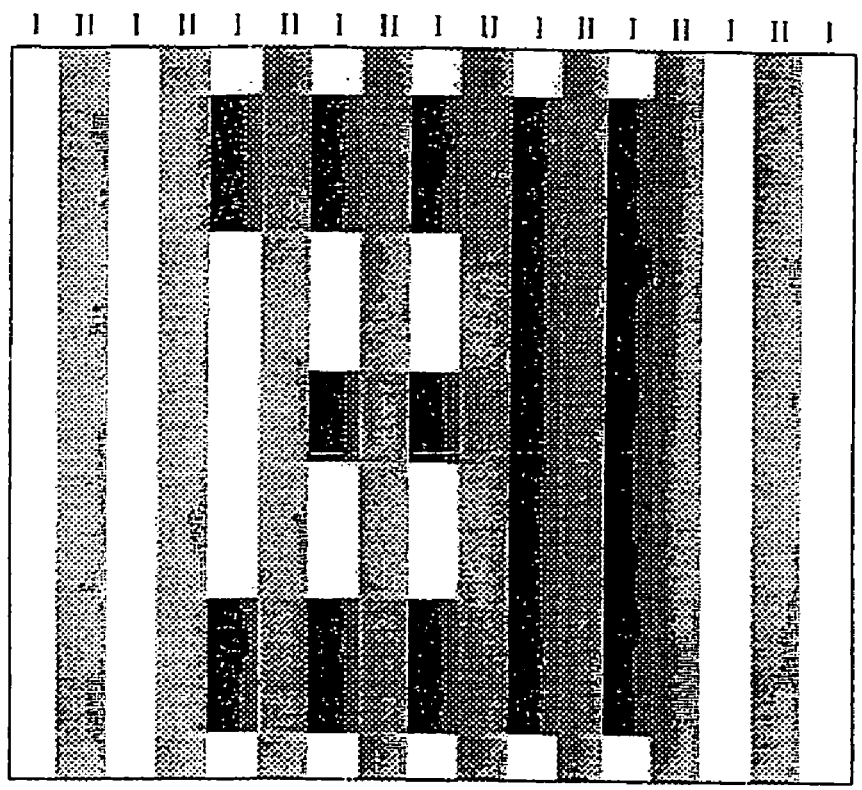
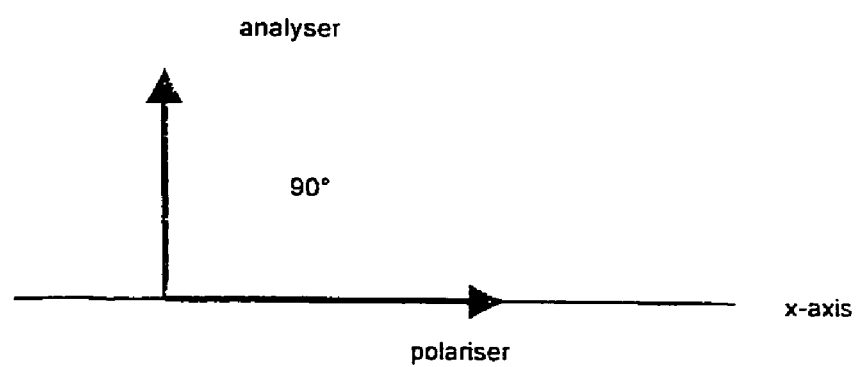

Figure 12: Magnified version of an optical component (picture II)
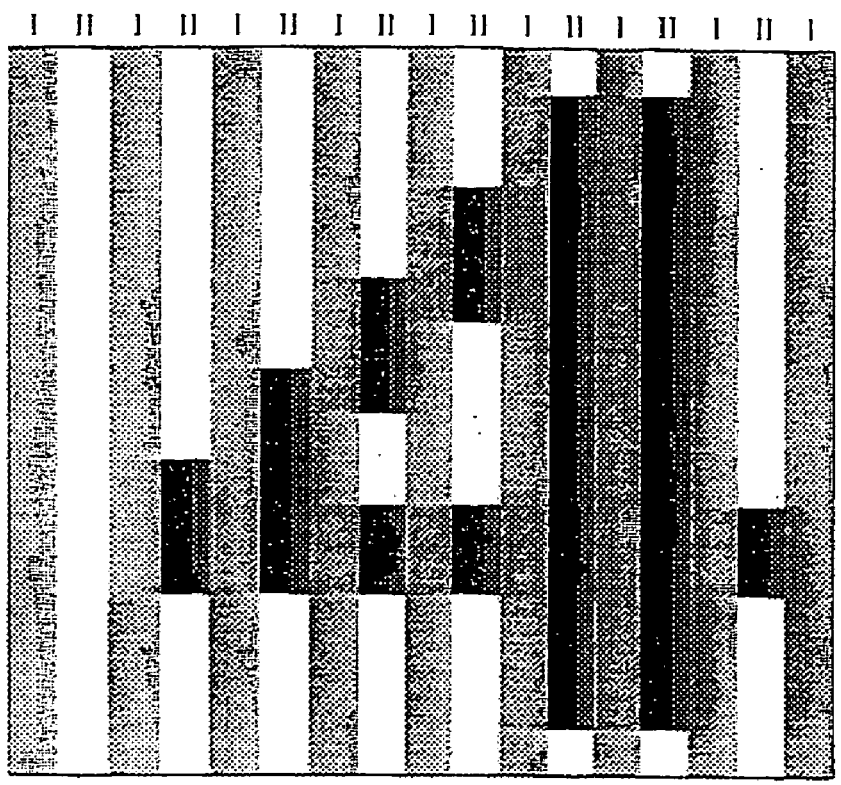
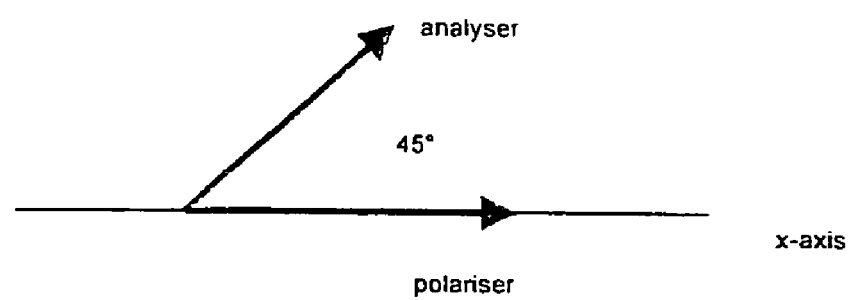

Figure 13: Magnified Stripe photo mask (picture I; positive)
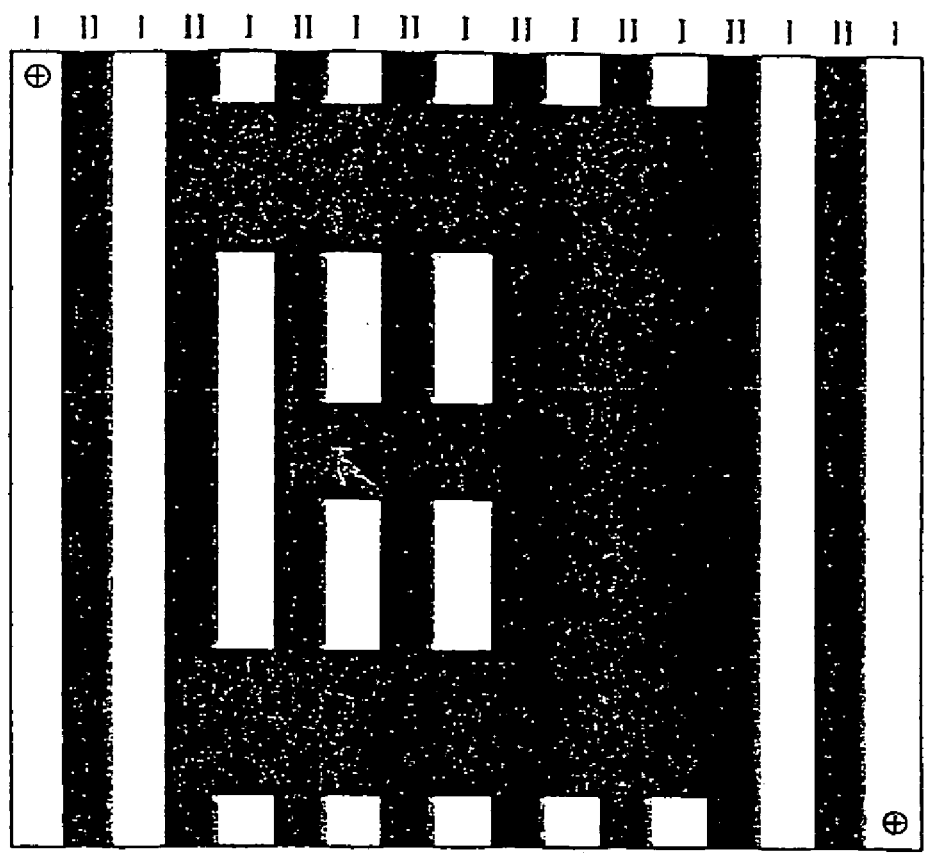

Figure 14: Stripe photo mask (picture 1; negative); magnified
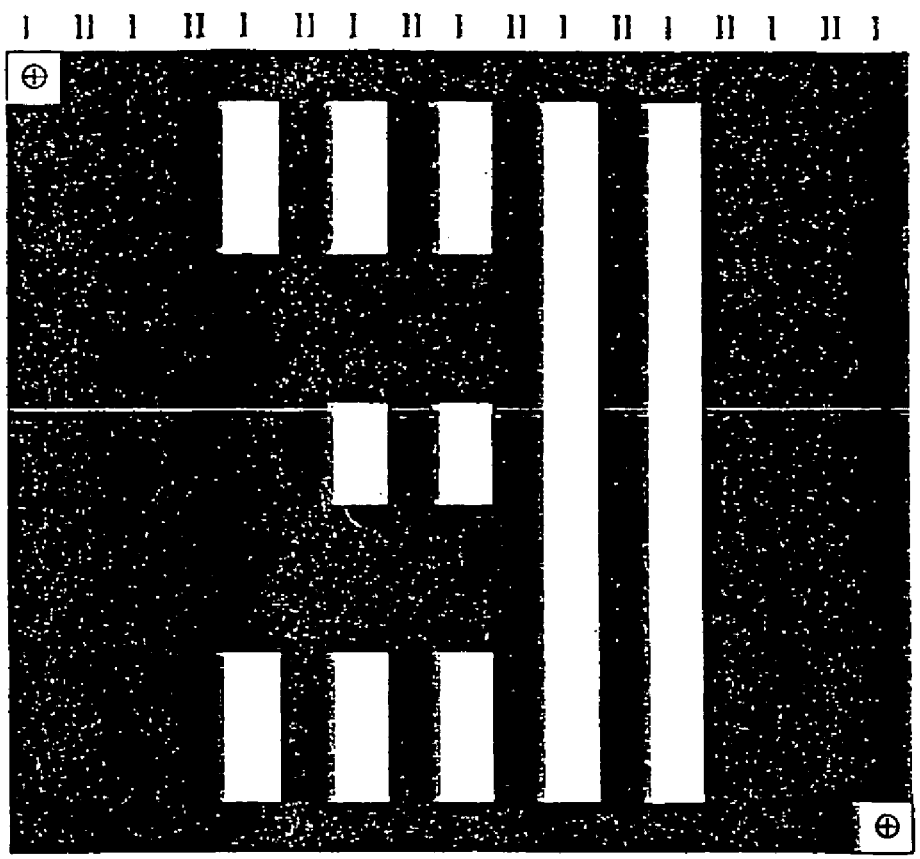

Figure 15: Stripe photo mask (picture II, positive); magnified
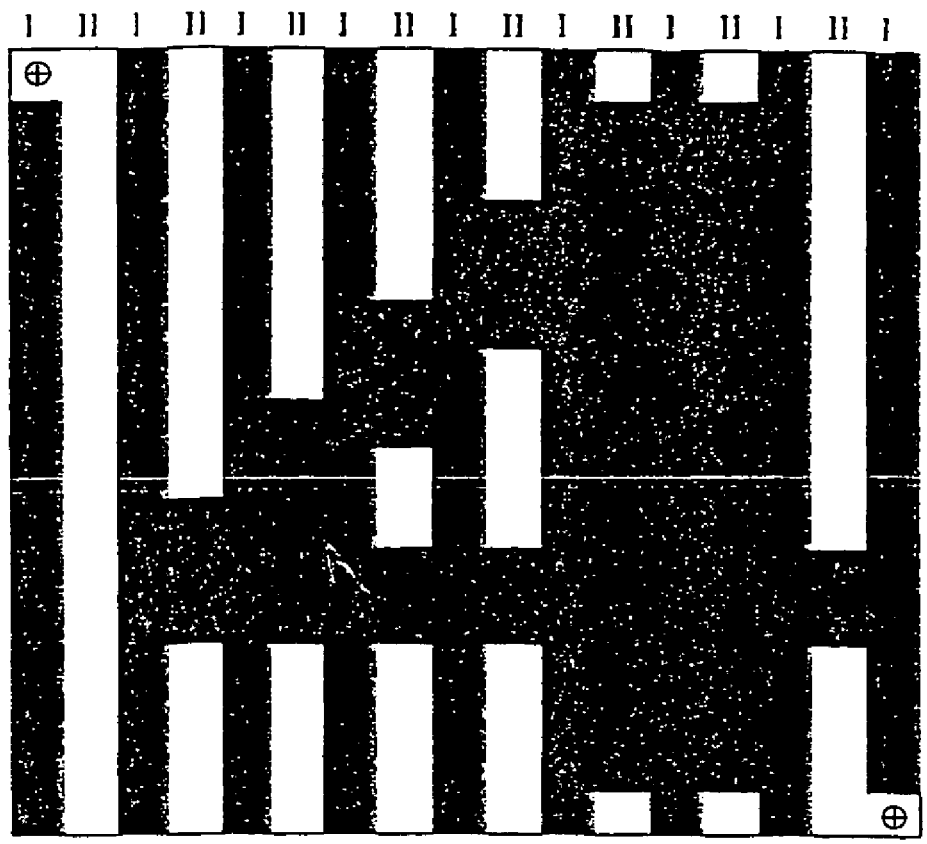

Figure 16: Stripe photo mask (picture II, negative); magnified
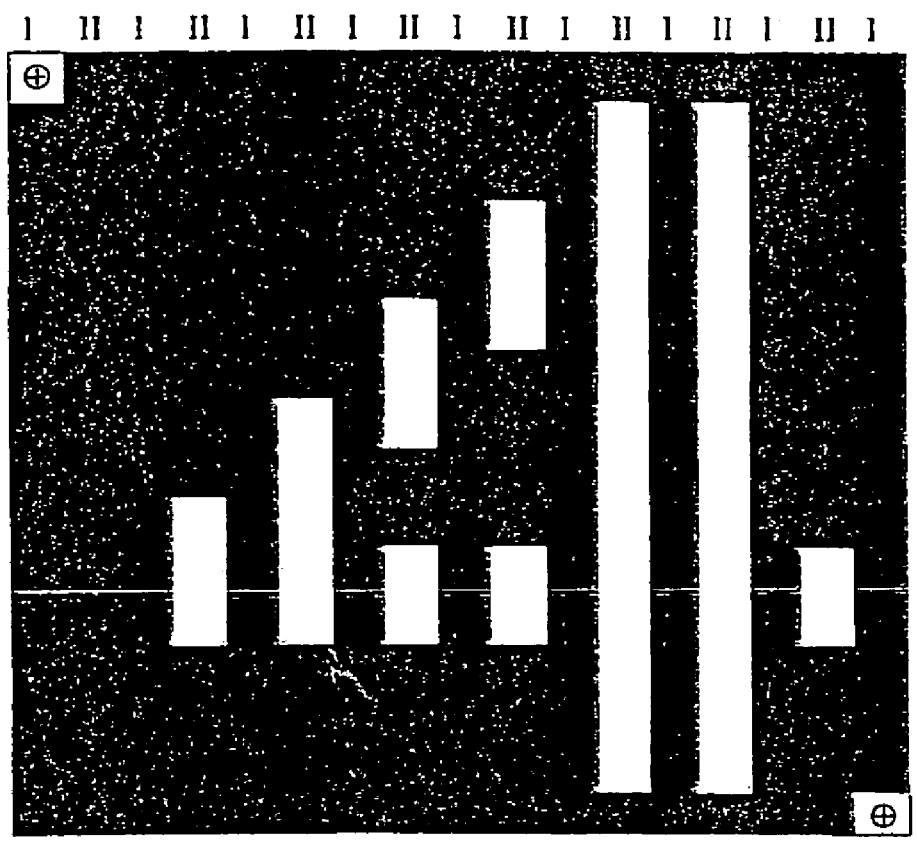

Figure 17: Optical Component working in the reflective mode
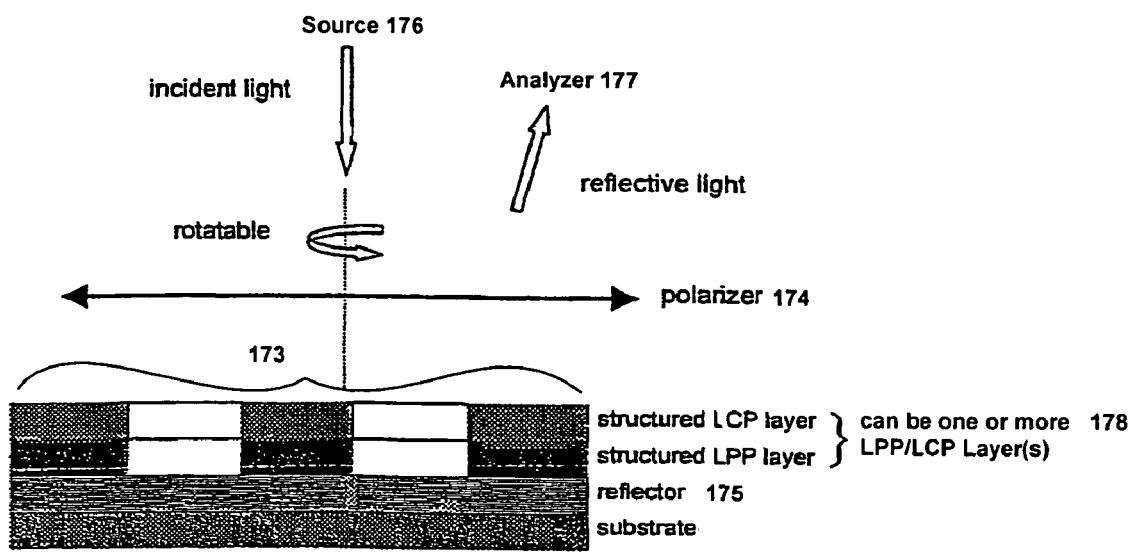

OPTICAL COMPONENT

BACKGROUND OF THE INVENTION

This application is a continuation of U.S. application Ser. No. 10/721,104, filed Nov. 26, 2003, now abandoned, which is a continuation of U.S. application Ser. No. 09/831,524, filed May 10, 2001, now abandoned, the disclosures of which are expressly incorporated herein by reference. U.S. application Ser. No. 09/831,524 is a national stage filing under 35 U.S.C. § 371 of international application No. PCT/IB99/01810, filed Nov. 10, 1999, which published in the English language.

The invention relates to an optical component containing a normally hidden image.

A particular use of the components according to the invention is in the field of protection against forgery and copying and simple yet unambiguous document authentication.

The increasingly high-quality copying techniques which are becoming available make it increasingly difficult to safeguard banknotes, credit cards, securities, identity cards and the like against forgery. Furthermore, counterfeit branded products (even including counterfeit pharmaceuticals) and copies of copyright-protected products, for example compact discs, computer software and electronics chips, are being produced and distributed worldwide. The increasing number of forgeries necessitates new authentication elements which are safeguarded against forgery and can be identified both visually and by machine.

In the field of copy-protecting banknotes, credit cards etc., there are already a considerable number of authentication elements. Depending on the value of the document to be protected, very simple or relatively highly complex elements are employed. Some countries are content to provide banknotes with metal strips which come out black on a photocopy. Although this prevents them from being photocopied, elements of this type are very easy to imitate. In contrast to this, there are also more complex authentication elements, for example holograms and cinegrams. Authentication elements of this type are based on the diffraction of light by gratings and need to be observed under different viewing angles in order to verify their authenticity. These diffracted elements produce three-dimensional images, color variations or kinematic effects which depend on the angle of observation and have to be checked on the basis of predetermined criteria or rules. It is not practically possible to use machines for reading information, for example images or numbers, encoded using this technique. Furthermore, the information content of these elements is very limited, and only an optical specialist will be capable of discriminating definitively between forgeries and an original.

A further consideration with diffractive optical effects is that these have also been used for consumer articles such as wrapping paper, toys, and the like. The relevant production methods have therefore become widely known and are correspondingly straightforward to imitate.

Further to the diffractive elements mentioned above, other components are also known which are suitable for optimum copy protection. These include optical components, as disclosed, for example, by EP-A-689084 or EP-A-689065, that is to say components with an anisotropic liquid-crystal layer, which the latter has local structuring of the molecular orientation.

These components are based on a hybrid layer structure which consists of an orientation layer and a layer which is in contact with it and consists of liquid-crystal monomers or pre-polymers cross-linked with one another. In this case, the orientation layer consists of a photo-oriented polymer network (PPN)—synonymous with LPP used in other literature—which, in the oriented state, through a predetermined array, defines regions of alternating orientations. During the production of the liquid-crystal layer structure, the liquid-crystal monomers or pre-polymers are zonally oriented through interaction with the PPN layer. This orientation which, in particular, is characterized by a spatially dependent variation of the direction of the optical axis, is fixed by a subsequent cross-linking step, after which a cross-linked, optically structured liquid crystal monomer or pre-polymer (LCP) with a pre-established orientation pattern is formed. Under observation without additional aids, both the orientation pattern itself and the information written into the cross-linked LCP layer are at first invisible. The layers have a transparent appearance. If the substrate on which the layers are located transmits light, then the LCP orientation pattern or the information which has been written become visible if the optical element is placed between two polarizers. If the birefringent LCP layer is located on a reflecting layer, then the pattern, or the corresponding information, can be made visible using only a single polarizer which is held over the element. LPP/LCP authentication elements make it possible to store information, virtually without restriction, in the form of text, images, photographs, and combinations thereof. In comparison with prior art authentication elements, the LPP/LCP elements are distinguished in that the authenticity of the security feature can be verified even by a layman since it is not first necessary to learn how to recognize complicated color changes or kinematic effects. Since LPP/LCP authentication elements are very simple, reliable, and quick to read, machine-readable, as well as visual information, can be combined in the same authentication element.

However, there remains the risk that, in the course of time, forgers will be able to master this technique.

In the components described above, one pictorial element is present (whether visible or invisible).

It would be desirable to improve the security or entertainment value of such a component.

According to the present invention, an optical component comprises one or more retarder(s) in which are embedded a plurality of images, the images being so arranged that, at any point in the plane of the component, an element of not more than one image is present, each image being associated with a different interaction with polarized light. This association can be achieved in various ways, for example, each image is embedded in patterned retarder(s) (one or more), each of them having patterns with different optical axis.

The invention also provides a viewing system, comprising a source of polarized light, a component as set forth above, through which the polarized light can travel, and an analyzer (in practice, a polarizing sheet) for light which has traversed the component, the analyzer being rotatable about the axis of the direction of travel of the light. The source of polarized light may be a polarizing sheet applied to the surface of the component.

The different images may be contained in successive parallel stripes, each preferably narrower than the eye can resolve, into which the surface area of the component is divided; if these are n images, any one image will usually be represented on every nth stripe.

Such an optical component has the surprising property, valuable in the fields of entertainment, document authentication and forgery countermeasures, that simply by rotating a polarizer (=the analyzer), a plurality of different images, all visible in ordinary light, can be seen one after the other. Previously, it was possible to reveal only one hidden image in this way. However, all the advantages of the "one hidden image" technology, as described for example in EP-A-689065, PCT/IB98/00687 or CH 841/98, can be maintained.

The invention will now be described by way of example with reference to the accompanying drawings, in which:

FIG. 1 shows magnified a first optical component according to the invention, manufactured with two retarders, in its appearance when viewed through an analyzer in the orientation indicated in the Figure;

FIG. 2 shows the same component as FIG. 1, in its appearance when viewed through an analyzer in the orientation indicated in FIG. 2, and FIG. 3 shows the same component as FIG. 1, in its appearance when viewed through an analyzer in the orientation indicated in FIG. 3 leading to the 'negative' counterpart of the image shown in FIG. 1;

FIG. 4 shows the same optical component as FIG. 1, in its appearance when viewed through an analyzer in the orientation indicated in FIG. 4 leading to the 'negative' counterpart of the image shown in FIG. 2;

FIG. 5 shows a striped photo mask which includes the information of picture I. This striped photo mask is needed for (this example of) the production process of the optical component.

FIG. 6 shows a striped photo mask which includes the information of a second image, picture II. This photo mask is optional in the production process of the optical component.

FIG. 7 shows a striped but otherwise completely unpatterned photo mask, in other words, including no picture information. This striped photo mask is used in the production process of the optical component.

FIG. 8 shows a photo mask which reflects picture II. This mask does not include any stripes as shown in FIGS. 5, 6, and 7.

FIG. 9 shows the contrast dependence of each image (here 2 images) related to the analyzer angle with respect the optical component. The analyzer angle is interrelated to the x-Axis (when the analyzer is parallel to the x-Axis, then the angle is 0°). At specific analyzer angles, peaks of maximum contrasts are reached.

FIG. 10 shows the contrast dependence of each image (here 2 images) related to the analyzer angle in case of a second optical component according to the invention and described in the following figures, this second optical component being manufactured with 1 retarder. The analyzer angle is interrelated to the x-Axis (when the analyzer is parallel to the x-Axis, then the angle is 0°). At specific analyzer angles, peaks of maximum contrasts are reached.

FIG. 11 shows, magnified, the second optical component in its appearance when viewed through an analyzer in the indicated orientation;

FIG. 12 shows the second optical component in its appearance when viewed through an analyzer in the indicated orientation different from FIG. 11;

FIG. 13 shows a striped photo mask which includes the 'positive' ('positive' means dark information patterns on bright background) information of picture I of the second optical component.

FIG. 14 shows a striped photo mask which includes the 'negative' ('negative' means bright information patterns on dark background) information of picture I.

FIG. 15 shows a striped photo mask which includes the 'positive' information of a second image, picture II.

FIG. 16 shows a striped photo mask which includes the 'negative' information of a second image, picture II. The photo masks of FIGS. 13-16 are all needed in this example of the production process of the optical component.

FIG. 17 shows schematically an optical component according to the invention, working in the reflective mode.

EXAMPLE 1

An optical component according to FIGS. 1, 2, 3, and 4 is made by applying a layer of suitable orientable linearly photopolymerisable (LPP) material such as cinnamic acid derivatives or ferulic acid derivatives illustrated for instance in patent publications EP-A-611786, WO 96/10049 and EP-A-763552 to a transparent substrate. This layer with a thickness of about 50 nm is exposed through a photo mask, shown schematically in FIG. 5, to polarized light of different polarization directions. The photo mask is of alternative adjacent opaque (II) and in-principle-transparent (I) stripes which, when projected onto the layer of LPP material, have a width of ⅛ mm each, which is smaller than the eye can resolve. The stripes (I) are themselves blacked out in parts, to leave the image of an upright cross. The illumination sequence for this first LPP layer is shown in Table 3 with ultimate results shown in Table 1: the angle α of the linear polarized light with a suitable wavelength in respect to the x-Axis traveling through the bright picture areas of stripes I (FIG. 5) is +13.5° (illumination step 1); the picture illustrated in FIG. 5 is an upright cross but any image can be used. Then, this mask is replaced by the photo mask shown in FIG. 7. The opaque stripes (II) of both masks coincide, but the former unexposed areas of stripes I of FIG. 5 will be now exposed at an angle α of −13.5° (illumination step 2); finally this mask is removed and a third illumination step parallel to the x-Axis (α=0°) is applied to expose the stripes II of FIG. 5 (illumination step 3). After these 3 illumination steps all areas of the first LPP layer has been exposed to polarized light of a suitable wavelength. These exposures cause polymerization, in respectively different preferred alignments.

Thereafter, this first LPP layer is coated with a crosslinkable liquid crystal monomer or pre-polymer mixture (LCP) which shows birefringence, such as LCP mixture $M_{LCP}$ described in more detail later. (—$M_{LCP}$ has an optical anisotropy Δn of 0.13 leading to a film thickness of 1.5 μm—). The LCP material adopts the alignment (if any) of the immediately underlying region of the LPP layer. The whole is then exposed to unpolarized (isotropic) light of a suitable wavelength to crosslink the LCP material (illumination step 4 of Table 3).

Then, a second LPP layer (film thickness about 50 nm) is coated directly on the former LCP layer. Similar to the first LPP layer, further 4 exposures (illumination steps 5 to 8 in Table 3) to polarized light of a suitable wavelength are applied to this second LPP layer: the angle α of the linear polarized light in respect to the x-Axis traveling through the bright picture areas of stripes I of the photo mask (FIG. 5) is +31.5° (illumination step 5). Then, this mask is replaced by the photo mask shown in FIG. 7 and the former unexposed areas of stripes I of FIG. 5 will now be exposed at an angle α of −31.5° (illumination step 6). Then, the current (FIG. 7) mask is replaced by the photo mask without any stripes of FIG. 8; the picture II illustrated in FIG. 8 is a diagonal cross but any image can be used. The bright areas of stripes II which were not exposed yet are illuminated with polarized light at an angle α of +45° (illumination step 7). Finally, also this mask is removed and all areas which were not exposed before are illuminated by polarized light parallel to the x-Axis (α=0°) (illumination step 8). These exposures cause polymerization, in respectively different preferred alignments.

Thereafter, this second LPP layer is coated with a crosslinkable liquid crystal monomer or pre-polymer mixture (LCP) which shows birefringence, such as LCP mixture $M_{LCP}$ ($M_{LCP}$ has an optical anisotropy Δn of 0.13 leading to a film thickness of 1.5 μm). Again, the LCP material adopts the alignment (if any) of the immediately underlying region of the LPP layer. The whole is then exposed to unpolarized (no mask necessary) light of a suitable wavelength to crosslink the LCP material (illumination step 9).

The various retarder layers may have the same (as here) or different optical retardations Δnd.

This completes the manufacture of the optical component, which in normal light is transparent.

In use, the optical component will be examined for authenticity in the following way.

It is placed on a light box emitting linearly polarized light, and appears transparent in transmission.

To check it, it is viewed through a rotatable sheet carrying a polarizing grating; such sheets are known as analyzers.

In summary, because of the different modes of interaction of the two images with polarized light, as the analyzer is rotated, the upright cross (stripes I, FIG. 1) appears and disappears, to be replaced by the diagonal cross (stripes II, FIG. 2), which also disappears on continued rotation of the analyzer. It is easy to verify whether or not a document of unknown authenticity displays two different images when inspected this way. The dependence of the contrast on the analyzer angle is also represented in FIG. 9.

In more specific detail, the appearance of images depends on various angle and retardations as set forth in the following tables, in which the symbols have the following meaning:

$\delta_1$ Optical axis of first LCP layer;
$\delta_2$ Optical axis of second LCP layer;
x-Axis: Axis of polarizing grating of inspection arrangement; $\alpha=0°$ means parallel to the x-Axis;
x, y: color co-ordinates indicate the position in the Chromaticity Diagram; for example, stripes I in FIG. 2 appear grey to brownish; the color coordinates of these stripes are calculated as x=0.3684 and y=0.3609 leading to such a slightly colored appearance described as brownish;
normed brightness: 1.000=brightness of inspection light as viewed through polarizers and analyzer arranged parallel, no retarder present;
$\Delta nd_1$, $\Delta nd_2$: Optical retardations of the LCP layers ($\Delta nd_1 = \Delta nd_2 = 0.2$ μm);
$d_1$, $d_2$: Thickness of LCP retarder layers ($d_1 = d_2 = 1.5$ μm).

Table 2 shows calculated values of the feasible contrast ratios and colors which can be achieved with the optical component described in Example 1.

EXAMPLE 2

In another example according to the invention, it is possible to make a similar secure component with only one retarder layer. This component is examined for authenticity by the procedure already described. Upon rotating the analyzer, peaks of maximum contrast are obtained at specific rotation angles, at each of which a respective one of the (otherwise hidden) images becomes visible (FIG. 10).

An optical component according to FIGS. 11 and 12 (their 'negative' counterparts are not shown here, but appear—similar to Example 1 —when the analyzer angle to the x-Axis is 0° and −45°, respectively) is made by applying a layer of suitable orientable linearly photo-polymerizable (LPP) material such as cinnamic acid derivatives or ferulic acid derivatives illustrated for instance in patent publications EP 611786, WO 96/10049 and EP 763552 to a transparent substrate. This layer, with a thickness of about 50 nm, is exposed through a photo mask, shown schematically in FIG. 13, to polarized light of different polarization directions. The photo mask is of alternative adjacent opaque (II) and in-principle-transparent (I) stripes which, when projected onto the layer of LPP material, have a width of ⅛ mm each which is smaller than the eye can resolve (same resolutions show masks illustrated in FIGS. 14, 15, and 16). The stripes (I) are themselves blacked out in parts, to leave the image of a character '3'. The illumination sequence for this LPP layer is: the angle $\alpha$ of the linear polarized light with a suitable wavelength in respect to the x-Axis traveling through the bright picture areas of stripes I (FIG. 13) is +45° (illumination step 1); the picture illustrated in FIG. 13 is a character '3' but any image can be used. Then, this mask is replaced by the photo mask shown in FIG. 14. This mask is—except the opaque stripes II—exactly the 'negative' counterpart of the mask shown in FIG. 13. The opaque stripes (II) of both masks coincide, but the former unexposed areas of stripes I of FIG. 13 will be now exposed at an angle $\alpha$ of 0° (illumination step 2); then a third mask (FIG. 15) is applied including the image information of picture II; the picture illustrated in FIG. 15 is a character '4', but any image can be used. The angle $\alpha$ of the linear polarized light in respect to the x-Axis traveling through the bright picture areas of stripes II of the photo mask (FIG. 15) is +22.5° (illumination step 3). Then, this mask is replaced by the photo mask shown in FIG. 16 and the former unexposed areas of stripes II of FIG. 15 will now be exposed at an angle $\alpha$ of +67.5° (illumination step 4). These exposures cause polymerization, in respectively different preferred alignments.

Thereafter, this LPP layer is coated with a cross-linkable liquid crystal monomer or pre-polymer mixture (LCP) which shows birefringence, such as mixture $M_{LCP}$ ($M_{LCP}$ has an optical anisotropy $\Delta n$ of 0.13 leading to a film thickness of 1.5 μm). The LCP material adopts the alignment (if any) of the immediately underlying region of the LPP layer. The whole is then exposed to unpolarized (no mask necessary) light of a suitable wavelength to crosslink the LCP material (illumination step 5).

This completes the manufacture of the optical component, which in normal light is transparent.

In use, the optical component will be examined for authenticity in the following way.

It is placed on a light box emitting linearly polarized light, and appears transparent in transmission.

To check it, it is viewed through a rotatable sheet carrying a polarizing grating; such sheets are known as analyzers.

In summary, because of the different modes of interaction of the various images patterns with polarized light, as the analyzer is rotated, the character '3' (stripes I, FIG. 13) appears and disappears, to be replaced by the character '4' (stripes II, FIG. 14), which also disappears on continued rotation of the analyzer. It is easy to verify whether or not a document of unknown authenticity displays two different images when inspected this way.

When placing or attaching the optical components described in Examples 1 and 2 on top of a reflector 175 which maintains the polarization direction of incident light from source 176, and when using a polarizer 174 which is rotatable about the axis of the direction of travel of the light which has traversed the polarizer 174 and the optical component, such light is reflected at the reflector 175 and traverses a second time the optical component and the polarizer 174 (schematically shown in FIG. 17). Then similar images seen in the transmissive mode illustrated in Example 1 and 2 are observed: by rotating the polarizer 174, peaks of maximum contracts for each image 173 are obtained at specific rotation angles of the polarizer 174, enabling, at each such angle, visualization of a respective image 173 not otherwise visible using analyzer 177; the image 173 appears bluish/white or violet/whitish with relative poor contrasts because the optical retardations and its optical axis were not optimized for the reflective operation mode.

The production of a PPN (=LPP) and LCP layer (retarder 178) which can be used according to embodiments of the invention will be described still by way of example, in more detail below.

1. Production of a PPN Layer

Suitable PPN materials are described for instance in patent publications EP-A-611786, WO 96/10049 and EP-A-763552, such as cinnamic acid derivatives or ferulic acid derivatives. For the foregoing Examples, the following PPN material was chosen:

Polymer:

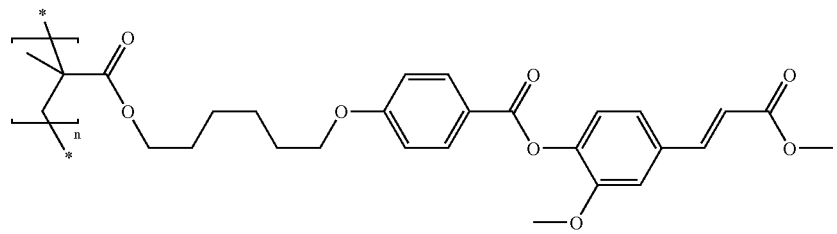

A glass plate was spin-coated with a 2 percent strength solution of the PPN material in cyclopentanone for one minute at 2000 rpm. The layer was then dried for 5 to 10 minutes at 120° C. on a hotplate. The layer was then exposed to linearly polarized light, Hg high-pressure lamp for 20 to 405 seconds (depending on the strength of the lamp and on the number of LPP/LCP layers of the optical component) at room temperature. The layer was then used as an orientation layer for liquid crystals.

2. Mixture $M_{LCP}$ of Cross-linkable LC Monomers for the LCP Layer.

In the examples, the following diacrylate components were used as cross-linkable

| | |
|---|---|
| Mon1 | 80% |
| Mon2 | 15% |
| Mon3 | 5% |

In addition, a further 2% of the Ciba-Geigy photoinitiator IRGACURE (trade mark) was added to the mixture.

The mixture $M_{LCP}$ was then dissolved in anisol. By means of the $M_{LCP}$ concentration in anisol, it was possible to adjust the LCP layer thickness over a wide range. Especially for the

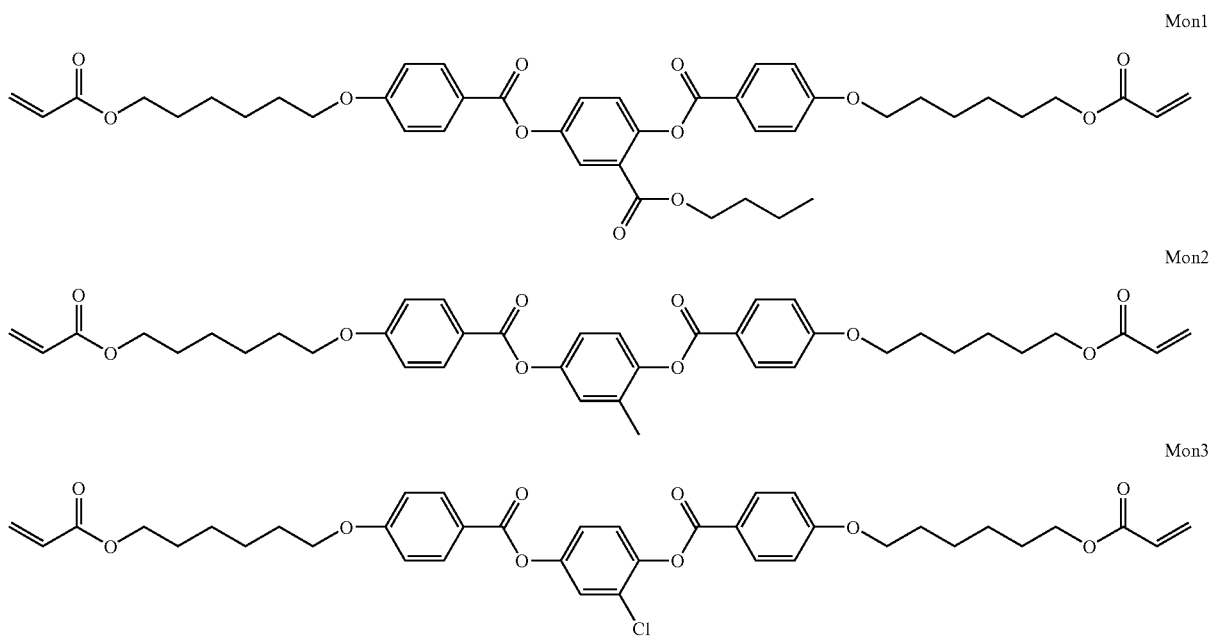

Using these components, a supercoolable nematic mixture $M_{LCP}$, with particularly low melting point (Tm~35° C.) was developed, making it possible to prepare the LCP layer at room temperature.

The diacrylate monomers were present with the following composition in the mixture:

examples of optical components described in this patent, desired retardations Δnd of 0.2 μm could be achieved.

For photoinitiated cross-linking of the LC monomers, the layers were exposed to isotropic light from a xenon lamp for about 5 to 30 minutes (depending on the strength of the lamp) in an inert atmosphere.

The optical effects described above, as well as the corresponding layer structures and material compositions, represent no more than a choice from many possibilities according to the invention, and may in particular be combined in a wide variety of ways in order to develop authenticating elements.

Thus, it is of course possible for any other kind of birefringent layer than the LCP layer described to be used to produce an optical effect that can be employed in optical components, for example, for authentication elements.

It is furthermore possible for the examples described above to use not a PPN orientation layer but a different orientation layer which, according to the desired optical property and resolution, has the same or similar properties to a PPN layer. It is also conceivable to produce the orientation required for a retarder layer using a correspondingly structured substrate. A structured substrate of this type can, for example, be produced by embossing, etching and scratching.

TABLE 1

Arrangement of the optical axis of the LCP layers and optical appearance of the optical element. Optical Retardations $\Delta nd_1$ and $\Delta nd_2$ of the LCP-Retarder Layers $\Delta nd_1$ and $\Delta nd_2 = 0.2\ \mu m$

| | PICTURE I (Analyser 45° / Polariser) | | PICTURE II (Analyser 90° / Polariser) | |
|---|---|---|---|---|
| Angle of x-Axis to polarizer | 0° | 0° | 0° | 0° |
| Angle of x-Axis to analyzer | 45° | 45° | 90° | 90° |
| Angle of x-Axis to $\delta_1$ | +13.5° | 0° | +13.5° | 0° |
| Angle of x-Axis to $\delta_2$ | +31.5° | +45° | +31.5° | +45° |
| Normed brightness | 0.9925 | 0.5000 | 0.4859 | 0.8104 |
| Color co-ordinates x | 0.3343 | 0.3334 | 0.3684 | 0.3062 |
| y | 0.3355 | 0.3333 | 0.3609 | 0.3186 |
| Color | white | white | whitish/brownish | white |
| Appearance of the pixel | BRIGHT | GREY | GREYISH | BRIGHT |
| Angle of x-Axis to polarizer | 0° | 0° | 0° | 0° |
| Angle of x-Axis to analyzer | 45° | 45° | 90° | 90° |
| Angle of x-Axis to $\delta_1$ | −13.5° | 0° | −13.5° | 0° |
| Angle of x-Axis to $\delta_2$ | −31.5° | 0° | −31.5° | 0° |
| Normed brightness | 0.0052 | 0.5000 | 0.5000 | 0.0000 |
| Color co-ordinates x | 0.2669 | 0.3334 | 0.3684 | 0.3334 |
| y | 0.1539 | 0.3333 | 0.3603 | 0.3333 |
| Color | ca. violet | white | whitish/brownish | white |
| Appearance of the pixel | DARK | GREY | GREYISH | DARK |

TABLE 2

Contrasts

| | PICTURE I (Analyser 45° / Polariser) | | | PICTURE II (Analyser 90° / Polariser) | | |
|---|---|---|---|---|---|---|
| | | | overall effect | | | overall effect |
| Point on image | BRIGHT | GREY | BRIGHT | GREY | BRIGHT | BRIGHT |
| Color | white | white | ~white | whitish/brownish | white | ~whitish |
| Normed brightness | 0.993 | 0.500 | 0.747 | 0.486 | 0.810 | 0.648 |
| Point on image | DARK | GREY | DARK | GREY | DARK | DARK |

TABLE 2-continued

Contrasts

|  | PICTURE I Analyser / 45° Polariser | | | | PICTURE II Analyser ⌐ 90° Polariser | |
|---|---|---|---|---|---|---|
| Color | ca. violet | white | ~dark violet | whitish/brownish | white | ~black |
| Normed brightness | 0.005 | 0.500 | 0.253 | 0.500 | 0.000 | 0.250 |
| Maximum contrast | 199:1 | 1.1 | 3:1 | 1:1 | >200:1 | 2.6:1 |

TABLE 3

Sequence of illumination steps with linear polarized and isotropic light to generate the optical component of Example 1 (picture in picture)

|  | Bright areas | Dark areas | Bright areas | Dark areas |
|---|---|---|---|---|
|  | Substrate LPP layer no. 1 Stripe mask (picture I) | Substrate LPP layer no. 1 Stripe mask I | Substrate LPP layer no. 1 Mask (picture II): | Substrate LPP layer no. 1 mask not necessary |
| Polarizer angle to x-Axis | α = +13.5° | α = −13.5° | < α = 0° > | |
| Illumination steps no: | 1 | 2 | 3 | |
|  | Substrate LPP layer no. 1 LCP-layer | Substrate LPP layer no. 1 LCP-layer | Substrate LPP layer no. 1 LCP-layer | Substrate LPP layer no. 1 LCP-layer |
| Illumination step no: (isotropic light) | < | | 4 | > |
|  | Substrate LPP layer no. 1 LCP-layer LPP layer no. 2 Stripe mask (picture I) | Substrate LPP layer no. 1 LCP-layer LPP layer no. 2 Stripe mask I | Substrate LPP layer no. 1 LCP-layer LPP layer no. 2 Mask (picture II) | Substrate LPP layer no. 1 LCP-layer LPP layer no. 2 Mask (picture II): not necessary |
|  | α = +31.5° | α = −31.5° | α = +45° | α = 0° |
| Polarizer angle to x-Axis Illumination steps no: | 5 | 6 | 7 | 8 |
|  | ⏜ 173 ⏜ | | | |
|  | Substrate LPP layer no. 1 LCP-layer LPP layer no. 2 LCP-layer | Substrate LPP layer no. 1 LCP-layer LPP layer no. 2 LCP-layer | Substrate LPP layer no. 1 LCP-layer LPP layer no. 2 LCP-layer | Substrate LPP layer no. 1 LCP-layer LPP layer no. 2 LCP-layer |
| Illumination step no: (isotropic light) | < | | 9 | > |

Illumination direction with polarized light = polariser angle to x-Axis

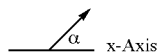 x-Axis

The invention claimed is:

1. An optical component, comprising one single retarder layer having embedded therein an integral number of n images, wherein n>1, the n images each comprising a positive counterpart and a negative counterpart and being so arranged that, at any point in the plane of said layer, an element of not more than one image is present, each image being associated with a different interaction with polarized light such that by rotating an analyzer the n images embedded in the single retarder layer can be seen one after the other, wherein the respective images of the n images, including the positive counterpart and their negative counterpart of each image, are contained in alternate areas or stripes provided in one single plane of the single retarder layer, and wherein the alternate areas or stripes of each of the n images comprise for each image at least two complementary regions with different preferred alignments, one complementary region encoding the positive counterpart and the other complementary region encoding the negative counterpart.

2. An optical component according to claim 1, wherein the images embedded in the retarder have specific image patterns each having a different optical axis from the other specific image patterns.

3. An optical component according to claim 1, wherein the respective images are contained in successive optionally parallel stripes.

4. An optical component according to claim 1, wherein the respective images are contained in successive alternate stripes.

5. An optical component according to claim 1, 3, or 4, wherein the areas or stripes are narrower than an eye can resolve, and at least one of said images is a photographic image.

6. An optical component according to claim 5, wherein there are an integral number n of images, each respectively being represented on every nth stripe or nth area.

7. An optical component according to claim 6, wherein n=2.

8. An optical component according to claim 1, 3, or 4, wherein each of the n images is represented on every n-th stripe or n-th area.

9. An optical component according to claim 8, wherein n=2.

10. An optical component according to claim 1, wherein the optical component is used for protection against at least one of forgery and copying.

11. An optical component according to claim 1, wherein the respective images are contained in successive alternate parallel stripes.

12. An optical component, comprising one single retarder layer having embedded therein an integral number of n images, wherein n>1, the n images each comprising a positive counterpart and a negative counterpart and being so arranged that, at any point in the plane of said layer, an element of not more than one image is present, each image being associated with a different interaction with polarized light such that by rotating an analyser the n different images embedded in the single retarder layer can be seen one after the other, wherein the respective images of the n images, including the positive counterpart and the negative counterpart of each image, are contained in alternate areas provided in one single plane of the single retarder layer, and wherein the alternate areas of each of the n images are produced using for each image at least two complementary photomasks, each photomask for at least a positive counterpart or negative counterpart, and irradiating light of different polarization direction for use of each photomask.

13. An optical component according to claim 12, wherein each of the n images is represented on every n-th stripe or n-th area.

14. An optical component according to any one of claims 1, 12 or 13, wherein n=2.

* * * * *